(12) United States Patent
Domingo et al.

(10) Patent No.: US 7,495,064 B2
(45) Date of Patent: Feb. 24, 2009

(54) MANUFACTURE OF POLYCARBONATES

(75) Inventors: David Domingo, Murcia (ES); Ignacio Vic Fernandez, Madrid (ES); Jorge Garcia Agudo, Murcia (ES); Gerardo Hidalgo-Llinas, Murcia (ES); Alfredo Lopez-Carretero, Murcia (ES); Miguel Angel Salomon, Murcia (ES)

(73) Assignee: Sabic Innovative Plastics IP BV, Bergen op Zoom (NL)

( * ) Notice: Subject to any disclaimer, the term of this patent is extended or adjusted under 35 U.S.C. 154(b) by 285 days.

(21) Appl. No.: 11/426,467

(22) Filed: Jun. 26, 2006

(65) Prior Publication Data

US 2007/0299241 A1    Dec. 27, 2007

(51) Int. Cl.
*C08G 64/00*     (2006.01)
*C08G 63/02*     (2006.01)

(52) U.S. Cl. .................. 528/196; 264/176.1; 264/219; 422/131; 422/135; 528/198

(58) Field of Classification Search .............. 264/176.1, 264/219; 422/131, 135; 528/196, 198
See application file for complete search history.

(56) References Cited

U.S. PATENT DOCUMENTS

| | | | |
|---|---|---|---|
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,316,578 B1 | 11/2001 | McCloskey et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 7,041,775 B2 * | 5/2006 | Martinez et al. | 528/196 |
| 7,132,498 B2 * | 11/2006 | McCloskey et al. | 528/196 |
| 2002/0132957 A1 | 9/2002 | Brack et al. | |
| 2003/0010220 A1 | 1/2003 | Janssen | |
| 2003/0149223 A1 | 8/2003 | McCloskey et al. | |
| 2004/0068086 A1 | 4/2004 | Day et al. | |
| 2004/0087756 A1 | 5/2004 | Ramesh et al. | |
| 2005/0171323 A1 | 8/2005 | Kamps et al. | |
| 2005/0234211 A1 | 10/2005 | Martinez et al. | |
| 2006/0069228 A1 | 3/2006 | McCloskey et al. | |

FOREIGN PATENT DOCUMENTS

| | | |
|---|---|---|
| JP | 5009282 | 1/1993 |
| JP | 10-101786 | 4/1998 |
| JP | 10-101787 | 4/1998 |
| JP | 11-302228 | 11/1999 |
| JP | 2000129112 | 5/2000 |
| JP | 2002309015 | 10/2002 |
| WO | 03040208 | 5/2003 |
| WO | 03106149 | 12/2003 |

* cited by examiner

*Primary Examiner*—Terressa M Boykin
(74) *Attorney, Agent, or Firm*—Larson & Anderson, LLC

(57) ABSTRACT

A method of producing a polycarbonate is provided. In an embodiment of the present invention the method includes the steps of: (i) introducing to a melt polymerization reactor system a reaction mixture having a first dihydroxy compound and an acid stabilizer, a carbonate source, and a polymerization catalyst system containing $K_2HPO_4$; and (ii) allowing the reaction mixture to polymerize thereby forming polycarbonate.

29 Claims, 4 Drawing Sheets

Fig. 1: Mw results of the comparative example.
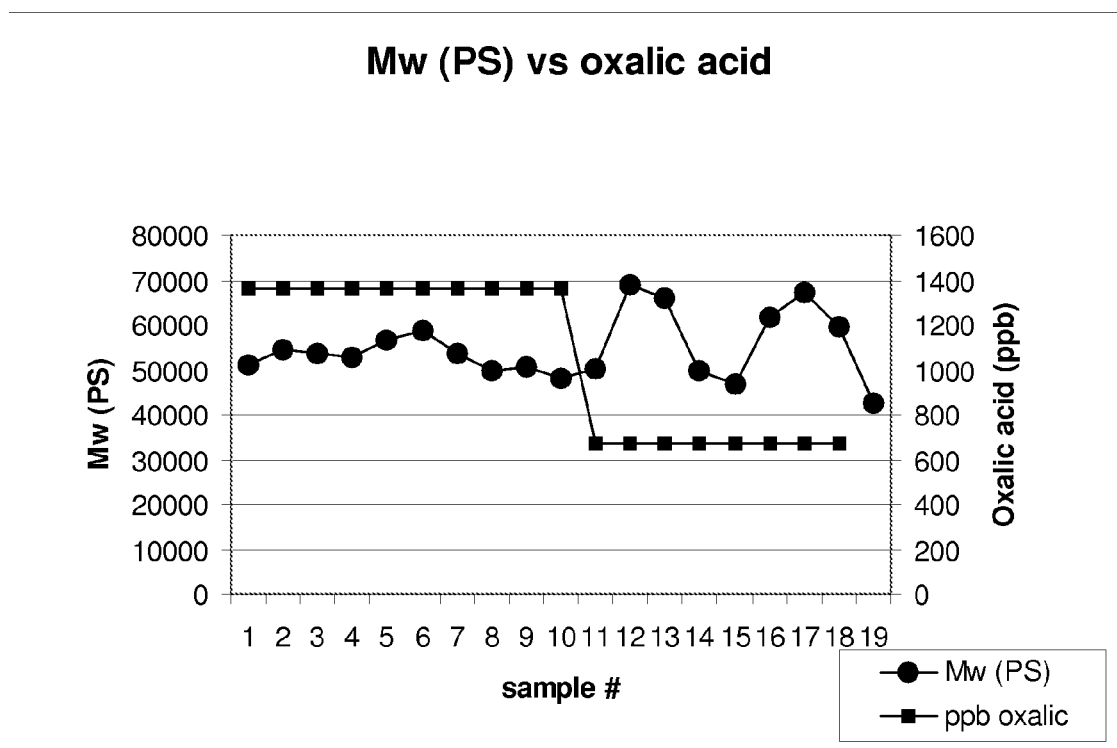

Fig. 2: Fries results of the comparative example.
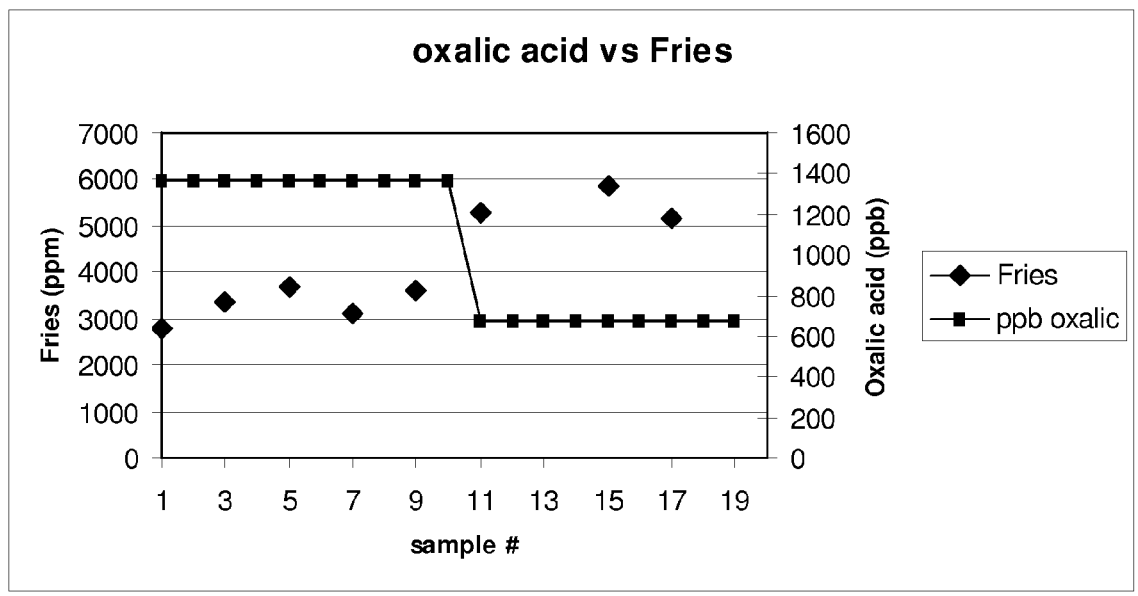

Fig. 3: Mw results of the invention example.
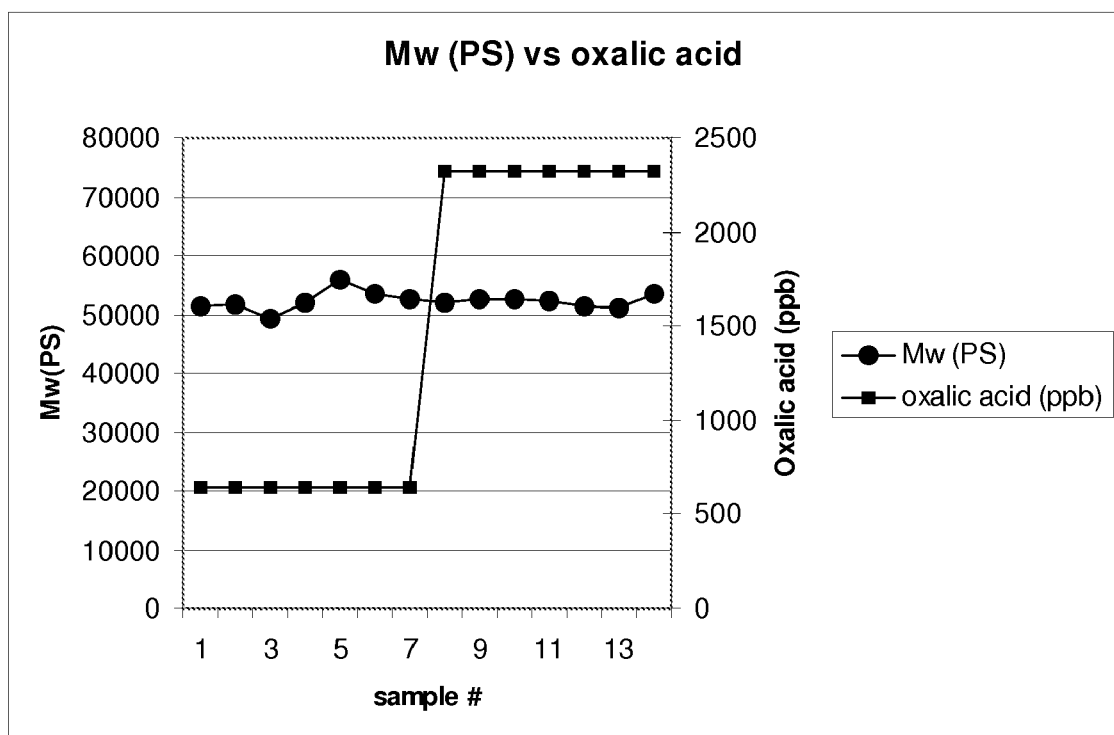

Fig. 4: Fries results of the invention example.
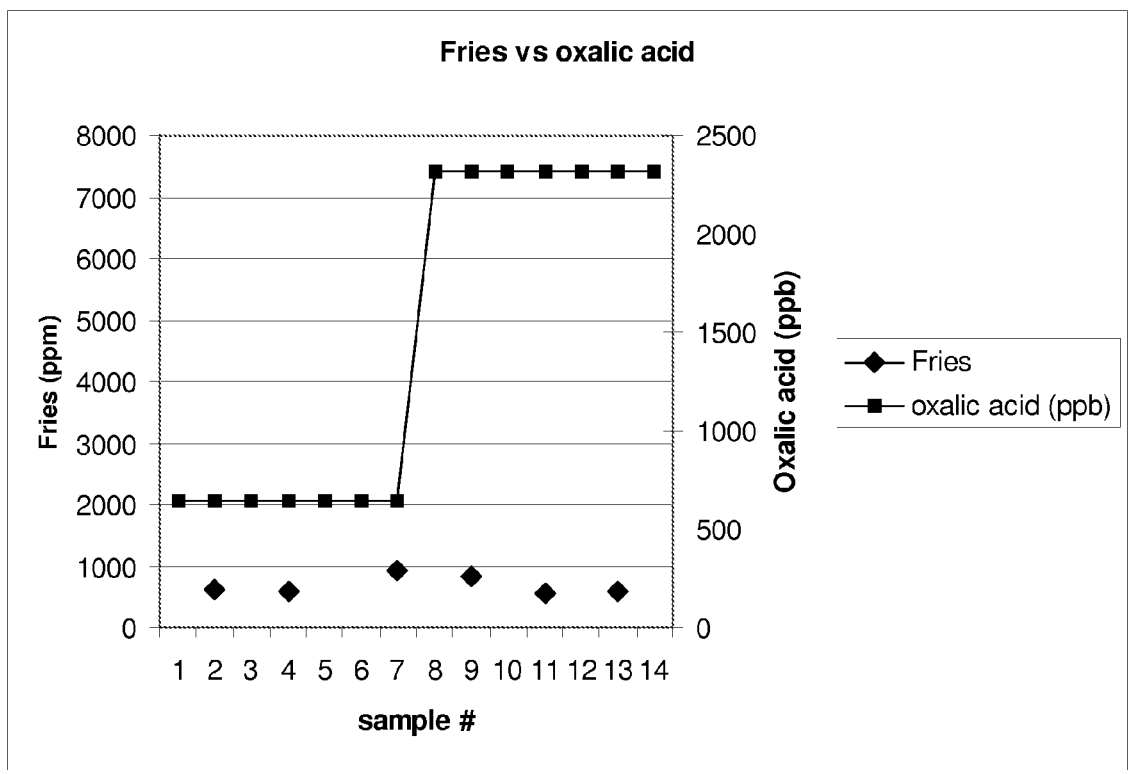

MANUFACTURE OF POLYCARBONATES

BACKGROUND OF THE INVENTION

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or (2) a melt polymerization process in which BPA is transesterified with a diarylcarbonate such as diphenyl carbonate (DPC) or bismethylsalicylcarbonate (BMSC).

For many applications, there has been a need for materials possessing the fundamental characteristics of transparency and toughness inherent in BPA polycarbonate but possessing, in addition, certain improvements in physical properties relative to those possessed by bisphenol A polycarbonate (BPA-PC), for example reduced birefringence for optical applications. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

One example of such a copolycarbonate comprises repeat units derived from resorcinol or hydroquinone in addition to repeat units derived from bisphenol A. The incorporation of resorcinol-derived and hydroquinone-derived repeat units into a BPA-polycarbonate confers excellent melt flow properties, molding properties, solvent and heat resistance, while maintaining the excellent mechanical properties and transparency inherent in bisphenol A polycarbonate.

Such copolycarbonates can be prepared by, inter alia, interfacial polymerization, melt polymerization, or solid state polymerization. The present invention relates to an improved method to prepare these and related copolycarbonates using the melt polymerization method.

Dihydroxy compounds used in producing polycarbonates such as, inter alia, hydroquinone, methylhydroquinone, and resorcinol are often prone to oxidation and/or reduction or in some cases undesired polymerization side reactions. It is also often the case that such dihydroxy compounds are provided by an outside manufacturer and not made at the location of polymerization. Due to the degradation potential of, inter alia, these dihydroxy compounds, additives are sometimes added in order to stabilize them during transportation to the polymerization plant or while they are stored on site. The additives slow down or stop the undesired side reactions and therefore prevent the degradation of the dihydroxy compounds in storage or in transit. Typical additives may be organic acids, for example oxalic acid. It would be extremely desirable to find a way of producing polycarbonate using the aforementioned stabilized dihydroxy compounds that allows greater control over the melt production process and the resulting polycarbonate properties.

SUMMARY OF THE INVENTION

The present invention provides a method for the melt production of polycarbonate using acid stabilized dihydroxy compounds. The dihydroxy compounds that are acid stabilized are not particularly limited. In one embodiment the acid stabilized dihydroxy compound is selected from the group consisting of catechol, resorcinol, hydroquinone, butyl hydroquinone, methyl hydroquinone, DMBPC, biphenol, o,o-biphenol, 2,2-dihydroxynaphtalene, and ortho-methyl BPA. In accordance with this embodiment, the invention provides a method of producing polycarbonate comprising the steps of:

(i) introducing to a melt polymerization reactor system comprising a polymerization reactor operating under melt polymerization conditions, a reaction mixture comprising:

an acid stabilizer and a first dihydroxy compound selected from the group consisting of catechol, resorcinol, hydroquinone, butyl hydroquinone, methyl hydroquinone, DMBPC, biphenol, o,o-biphenol, 2,2-dihydroxynaphtalene, and ortho-methyl BPA, an activated diarylcarbonate, and a polymerization catalyst system comprising a first catalyst compound having the structure:

$$M_p H_q Q$$

wherein Q is phosphate, sulfate, phosphite, sulfite, thiosulfate, or thiophosphate; H is hydrogen; M is an alkali metal, an alkali earth metal, or ($NH_4$); and p and q are independently 1 or 2, and wherein the first catalyst compound is present in an amount sufficient to catalyze a polymerization reaction between the free hydroxyl ends of the first dihydroxy compound and the activated diarylcarbonate, and (ii) allowing the reaction mixture to polymerize thereby forming polycarbonate.

In yet another embodiment of the present invention, a method of producing polycarbonate is provided that comprises the steps of:

(i) introducing to a melt polymerization reactor system comprising a polymerization reactor operating under melt polymerization conditions, a reaction mixture comprising a first dihydroxy compound and an acid stabilizer, a carbonate source, and a polymerization catalyst system comprising a first catalyst compound having the structure:

$$M_p H_q Q$$

wherein Q is phosphate, sulfate, phosphite, sulfite, thiosulfate, or thiophosphate; H is hydrogen; M is an alkali metal, an alkali earth metal, or ($NH_4$); and p and q are independently 1 or 2, and wherein the first catalyst compound is present in an amount sufficient to catalyze a polymerization reaction between the free hydroxyl ends of the first dihydroxy compound and the carbonate source, (ii) allowing the reaction mixture to polymerize thereby forming polycarbonate.

In preferred embodiments the methods described herein further comprise the step of (iii) removing the polycarbonate from the melt polymerization reactor system. In a further preferred embodiment at least one of steps (i), (ii), and (iii) is performed continuously, for example where all of steps (i), (ii), and (iii) are performed continuously.

BRIEF DESCRIPTION OF THE DRAWINGS

FIG. 1 is a schematic diagram showing the Mw results of the comparative example.

FIG. 2 is a schematic diagram showing the Fries results of the comparative example.

FIG. 3 is a schematic diagram showing the Mw results of the invention example.

FIG. 4 is a schematic diagram showing the Fries results of the invention example.

DETAILED DESCRIPTION

The present invention may be understood more readily by reference to the following detailed description of preferred embodiments of the invention and the examples included therein.

It has herein been found that dihydroxy compounds containing acidic preservation additives when used in manufacture of melt polycarbonates can lead to process instability thereby resulting in inconsistent molecular weight build, undesired side reactions, and variations of endcapping levels within the product polycarbonate. It is believed that the acid stabilizer undergoes an acid/base reaction with the alkali metal or earth alkali metal forming basic catalyst (e.g. sodium hydroxide) to form, inter alia, an organic salt (e.g. sodium oxalate) that behaves as a less active catalyst than the starting catalyst. It is further believed that this acid/base reaction between the acid stabilizer and the basic catalyst system changes the reactivity of the reaction mixture thereby leading to large variations in molecular weight build in continuous processes and increased side reactions such as Fries rearrangement within the product polycarbonate.

It is also possible that some of the acidic stabilizers partially decompose during the polymerization process due to thermal instability thereby generating other acidic byproducts that also react with the basic catalyst forming sodium compounds that will affect the final efficiency of the catalyst during the polymerization process thereby generating process fluctuations.

To compensate for the losses of catalyst activity due to the presence of acidic stabilizers, higher loadings of basic catalysts are often required to achieve the degree of polymerization desired. These required high levels of alkali or alkali earth metals can affect negatively the melt stability and hydrolytic stability of the polymers. Further, such high loadings can lead to the undesired properties within the polymer chain, such as high Fries levels.

It has been found that when using an acid stabilized dihydroxy compound as a monomer source for the production of polycarbonate, the use of a less basic catalyst than sodium hydroxide improves process stability thereby allowing better process control and improved final polymer properties. The dihydroxy compounds that are acid stabilized are not particularly limited. In one embodiment the acid stabilized dihydroxy compound is selected from the group consisting of catechol, resorcinol, hydroquinone, butyl hydroquinone, methyl hydroquinone, DMBPC, biphenol, o,o-biphenol, 2,2-dihydroxynaphtalene, and ortho-methyl BPA. In accordance with this embodiment, the invention provides a method of producing polycarbonate comprising the steps of:

(i) introducing to a melt polymerization reactor system comprising a polymerization reactor operating under melt polymerization conditions, a reaction mixture comprising: an acid stabilizer and a first dihydroxy compound selected from the group consisting of catechol, resorcinol, hydroquinone, butyl hydroquinone, methyl hydroquinone, DMBPC, biphenol, o,o-biphenol, 2,2-dihydroxynaphtalene, and ortho-methyl BPA, an activated diarylcarbonate, and a polymerization catalyst system comprising a first catalyst compound having the structure:

$$M_pH_qQ$$

wherein Q is phosphate, sulfate, phosphite, sulfite, thiosulfate, or thiophosphate; H is hydrogen; M is an alkali metal, an alkali earth metal, or $(NH_4)$; and p and q are independently 1 or 2, and wherein the first catalyst compound is present in an amount sufficient to catalyze a polymerization reaction between the free hydroxyl ends of the first dihydroxy compound and the activated diarylcarbonate, and (ii) allowing the reaction mixture to polymerize thereby forming polycarbonate.

In yet another embodiment of the present invention, a method of producing polycarbonate is provided that comprises the steps of:

(i) introducing to a melt polymerization reactor system comprising a polymerization reactor operating under melt polymerization conditions, a reaction mixture comprising a first dihydroxy compound and an acid stabilizer, a carbonate source, and a polymerization catalyst system comprising a first catalyst compound having the structure:

$$M_pH_qQ$$

wherein Q is phosphate, sulfate, phosphite, sulfite, thiosulfate, or thiophosphate; H is hydrogen; M is an alkali metal, an alkali earth metal, or $(NH_4)$; and p and q are independently 1 or 2, and wherein the first catalyst compound is present in an amount sufficient to catalyze a polymerization reaction between the free hydroxyl ends of the first dihydroxy compound and the carbonate source, (ii) allowing the reaction mixture to polymerize thereby forming polycarbonate.

In particularly preferred embodiments the methods described above further comprise the step of (iii) removing the polycarbonate from the melt polymerization reactor system. In a further preferred embodiment at least one of steps (i), (ii), and (iii) is performed continuously. For example where all of steps (i), (ii), and (iii) are performed continuously, such that a product polycarbonate stream may be continuously produced.

In the specification and the claims which follow, reference will be made to a number of terms which shall be defined to have the following meanings:

The singular forms "a", "an", and "the" include plural referents unless the context clearly dictates otherwise.

"Polycarbonate" refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy monomer unless the context is expressly limiting. Thus, the application encompasses copolycarbonates with monomers of 2, 3, 4, or more types of dihydroxy compounds.

"Catalyst system" or "catalyst" as used herein refers to a catalyst or catalysts that catalyze the transesterification of a dihydroxy compound with a carbonate source in the preparation of melt polycarbonate.

As used herein the term "Fries product" or "Fries rearrangement product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A species upon complete hydrolysis of the product polycarbonate.

One method to measure Fries rearrangement products is by the KOH methanolysis of resin. In this method the content of Fries is determined as follows. First, 0.5 grams of polycarbonate is dissolved in 4.0 ml of THF (containing p-terphenyl as internal standard). Next, 3.0 ml of 18% KOH in methanol is added to the solution. The resulting mixture is stirred for two hours. Next, 1.0 ml of acetic acid is added, and the mixture is stirred for 5 minutes. Potassium acetate is allowed to crystallize over 1 hour. The solid is filtered off and the resulting filtrate is analyzed by liquid chromatography using p-terphenyl as the internal standard. Fries content is reported in parts per million.

The Fries structures measured in this analysis, if present, include:

Linear Fries:

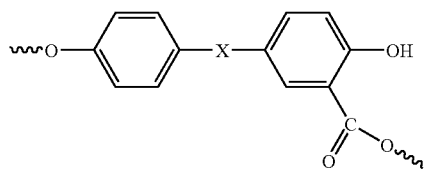

Acid Fries:

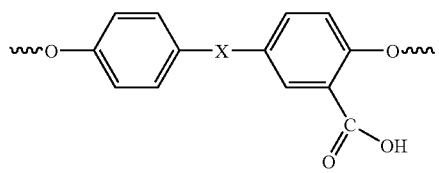

Branched Fries:

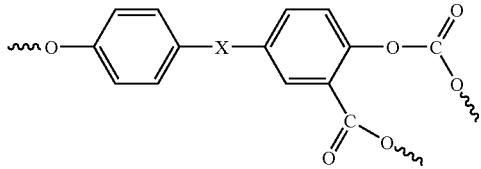

wherein X represents, for example, one of the groups of formula:

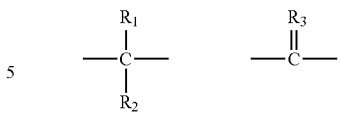

wherein $R_1$ and $R_2$ each independently represent a hydrogen atom or a monovalent linear or cyclic hydrocarbon group and $R_3$ is a divalent hydrocarbon group.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

Melt Polymerization Reactor System and Conditions:

Polycarbonate can be prepared by a number of processes. One of such processes is the melt transesterification of the free-hydroxyl ends of dihydroxy compositions with another. In preferred embodiments, a melt polymerization reactor system comprises an oligomer forming section and polymer weight building section. The types of equipment used in each these sections are not particularly limited and may include stirred or unstirred vessels, extruders, heat exchangers, flash tanks and the like.

In accordance with a preferred embodiment of the method of the present invention, a molten reaction mixture comprising a first dihydroxy compound and an acid stabilizer, a carbonate source, and the catalyst system described herein are contacted under melt polymerization conditions within the melt polymerization reaction system where they react such that polymer is built to a molecular weight ($M_W$) greater than 10,000 g/mol (molecular weights measured relative to polystyrene (PS) standards) and more preferably greater than 18,000 g/mol (molecular weights measured relative to polystyrene (PS) standards).

The term "contacting under melt polymerization conditions" will be understood to mean those conditions necessary to effect a reaction between the carbonate source and the dihydroxy compounds employed according to the method of the present invention. The reaction temperature is typically in the range between 150° C. and 350° C., more preferably between 180° C. and 310° C. The reaction is carried out in the presence of a catalyst system described below. The pressure may be at atmospheric pressure, supra atmospheric pressure, or a range of pressures, for example from 2 atmospheres to 15 torr in the initial stages of the polymerization reaction, and at a reduced pressure at later stages, for example in a range between 15 torr and 0.1 torr. The reaction time is generally in a range between 0.1 hours and 10 hours, preferably between 0.1 and 5 hours. The reaction is suitably carried out in the melt polymerization reactor system to form high molecular weight polycarbonates.

In the embodiments where the method further comprises the step of removing a product polycarbonate from the melt polymerization reaction system, at least one of the steps and more preferably all three steps are performed continuously. The term "continuously" means constant addition or drawing off, at a constant or variable flow rate, or pulsed addition or drawing off, with the provision that the total "off time," the time that no flow to or from the melt polymerization reaction system is occurring, does not exceed the "on time," when flow is occurring. In calculating the "on-time" and "off-time" only the time is taken into account during which changes occur to the melt polymerization reaction system. Changes include chemical changes (i.e. reaction) and feeding or emptying the reaction system.

Acid Stabilized Dihydroxy Compounds:

The acid stabilized dihydroxy compounds of the present invention are not particularly limited. For example, depending on the desired characteristics of the resulting polycarbonate, different dihydroxy compositions may be employed. Some desirable dihydroxy compounds that result in beneficial properties may be unstable and degrade prior to incorporating them into the polymer chain. For example, dihydroxy compositions such as resorcinol and hydroquinones produce desirable properties in polycarbonate, but are often unstable and easily oxidize, thereby resulting in colored polycarbonate. Acid stabilizers are typically added to these type of dihydroxy compounds to prevent degradation prior to their incorporation into polycarbonates. Acid stabilizers may also be added to other dihydroxy compositions that are more stable than the ones described above to prevent the possibility of degradation for various reasons (e.g. long storage times).

Although the methods of the present invention work with wide ranges of acid stabilized dihydroxy compounds it is herein contemplated that preferred acid stabilized dihydroxy compositions comprise compounds having the structure,

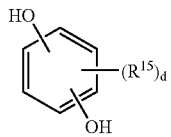

wherein each $R^{15}$ is independently at each occurrence a hydrogen atom, halogen atom, nitro group, cyano group, $C_1$-$C_{20}$ alkyl, $C_4$-$C_{20}$ cycloalkyl radical, $C_4$-$C_{20}$ aryl radical, and d is an integer from 0 to 4.

Non-limiting examples of dihydroxy compounds having the above structure are selected from the group consisting of catechol, resorcinol, hydroquinone, butyl hydroquinone, and methyl hydroquinone.

In other embodiments, the acid stabilized dihydroxy compound has two or more aromatic rings. For example the acid stabilized dihydroxy compound may be the following compounds having the corresponding structures:

DMBPC,

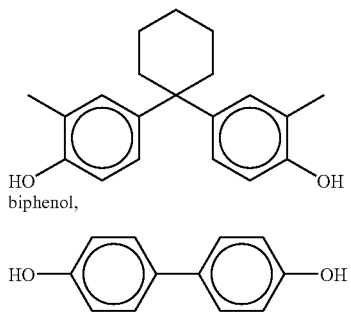

biphenol, o,o-biphenol,

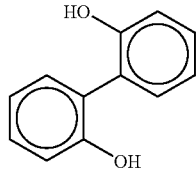

2,2-dihydroxynaphtalene,

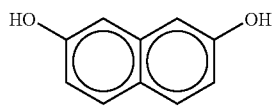

and/or ortho-methyl BPA,

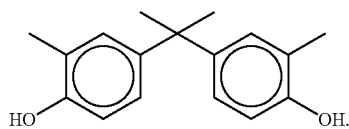

Acid Stabilizers

Methods of stabilizing dihydroxy compounds include, inter alia, adding acids to them after their manufacture and prior to storage, transport, and/or use in polymerization reactions. A non-limiting list of exemplary stabilizers includes: acetic acid, formic acid, estearic acid, propionic acid, ascorbic acid, citric acid, benzoid acid, and oxalic acid.

The amount of acid stabilizer added to dihydroxy compounds to slow down or stop undesired side reactions varies depending on, inter alia, the type of dihydroxy compound, the type of acid, storage time, and storage temperature. Acid stabilizers are known to be added to dihydroxy compounds in quite large ranges for example in a range between 0.01 to 1000 ppm, for example between 1 to 500 ppm, like 5 to 400 ppm, and even in a range between 25 and 200 ppm. As a non-limiting example oxalic acid is often added as a stabilizer to hydroquinone type dihydroxy compounds in a range of between 5 ppm to 400 ppm, for example at 85 ppm, for storage at room temperature.

General Dihydroxy Compounds:

In preferred embodiments of the present invention the reaction mixture will further comprise 1 or more additional dihydroxy compounds in addition to the acid stabilized dihydroxy compound described above to form, for example, a copolymer or a terpolymer. In a preferred embodiment the additional dihydroxy composition is bisphenol A (BPA). However, other dihydroxy compounds can be used and may be selected from the group consisting of bisphenols having structure I,

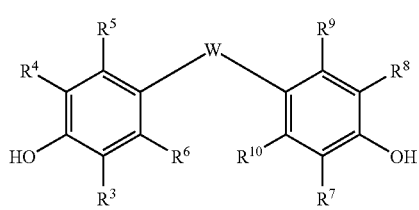

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

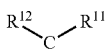

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphati ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure II

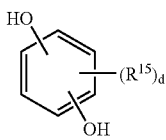

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures III and IV

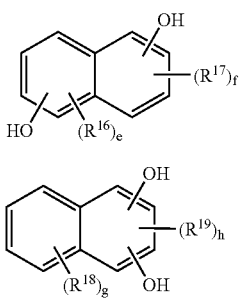

wherein $R^{16}$, $R^{17}$, $R^8$ and $R^9$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols I are illustrated by 2,2-bis(4-hydroxyphenyl)propane (bisphenol A);
2,2-bis(3-chloro-4-hydroxyphenyl)propane; 2,2-bis(3-bromo-4-hydroxyphenyl)propane;
2,2-bis(4-hydroxy-3-methylphenyl)propane; 2,2-bis(4-hydroxy-3-isopropylphenyl)propane;
2,2-bis(3-t-butyl-4-hydroxyphenyl)propane; 2,2-bis(3-phenyl-4-hydroxyphenyl)propane;
2,2-bis(3,5-dichloro-4-hydroxyphenyl)-propane; 2,2-bis(3,5-dibromo-4-hydroxyphenyl)propane;
2,2-bis(3,5-dimethyl-4-hydroxyphenyl)propane;
2,2-bis(3-chloro-4-hydroxy-5-methylphenyl)propane;
2,2-bis(3-bromo-4-hydroxy-5-methylphenyl)propane;
2,2-bis(3-chloro-4-hydroxy-5-isopropylphenyl)propane;
2,2-bis(3-bromo-4-hydroxy-5-isopropylphenyl)propane;
2,2-bis(3-t-butyl-5-chloro-4-hydroxyphenyl)propane;
2,2-bis(3-bromo-5-t-butyl-4-hydroxyphenyl)propane;
2,2-bis(3-chloro-5-phenyl-4-hydroxyphenyl)propane;
2,2-bis(3-bromo-5-phenyl-4-hydroxyphenyl)propane;
2,2-bis(3,5-disopropyl-4-hydroxyphenyl)propane;
2,2-bis(3,5-di-t-butyl-4-hydroxyphenyl)propane; 2,2-bis(3,5-diphenyl-4-hydroxyphenyl)propane;
2,2-bis(4-hydroxy-2,3,5,6-tetrachlorophenyl)propane;
2,2-bis(4-hydroxy-2,3,5,6-tetrabromophenyl)propane;
2,2-bis(4-hydroxy-2,3,5,6-tetramethylphenyl)propane;
2,2-bis(2,6-dichloro-3,5-dimethyl-4-hydroxyphenyl)propane;
2,2-bis(2,6-dibromo-3,5-dimethyl-4-hydroxyphenyl)propane;
1,1-bis(4-hydroxyphenyl)cyclohexane; 1,1-bis(3-chloro-4-hydroxyphenyl)cyclohexane;
1,1-bis(3-bromo-4-hydroxyphenyl)cyclohexane; 1,1-bis(4-hydroxy-3-methylphenyl)cyclohexane;
1,1-bis(4-hydroxy-3-isopropylphenyl)cyclohexane;
1,1-bis(3-t-butyl-4-hydroxyphenyl)cyclohexane; 1,1-bis(3-phenyl-4-hydroxyphenyl)cyclohexane;
1,1-bis(3,5-dichloro-4-hydroxyphenyl)cyclohexane;
1,1-bis(3,5-dibromo-4-hydroxyphenyl)cyclohexane;
1,1-bis(3,5-dimethyl-4-hydroxyphenyl)cyclohexane;
1,1-bis(3-chloro-4-hydroxy-5-methylphenyl)cyclohexane;
1,1-bis(3-bromo-4-hydroxy-5-methylphenyl)cyclohexane;
1,1-bis(3-chloro-4-hydroxy-5-isopropylphenyl)cyclohexane;
1,1-bis(3-bromo-4-hydroxy-5-isopropylphenyl)cyclohexane;
1,1-bis(3-t-butyl-5-chloro-4-hydroxyphenyl)cyclohexane;
1,1-bis(3-bromo-5-t-butyl-4-hydroxyphenyl)cyclohexane;
1,1-bis(3-chloro-5-phenyl-4-hydroxyphenyl)cyclohexane;
1,1-bis(3-bromo-5-phenyl-4-hydroxyphenyl)cyclohexane;
1,1-bis(3,5-disopropyl-4-hydroxyphenyl)cyclohexane;
1,1-bis(3,5-di-t-butyl-4-hydroxyphenyl)cyclohexane;
1,1-bis(3,5-diphenyl-4-hydroxyphenyl)cyclohexane;
1,1-bis(4-hydroxy-2,3,5,6-tetrachlorophenyl)cyclohexane;
1,1-bis(4-hydroxy-2,3,5,6-tetrabromophenyl)cyclohexane;
1,1-bis(4-hydroxy-2,3,5,6-tetramethylphenyl)cyclohexane;
1,1-bis(2,6-dichloro-3,5-dimethyl-4-hydroxyphenyl)cyclohexane;
1,1-bis(2,6-dibromo-3,5-dimethyl-4-hydroxyphenyl)cyclohexane;
1,1-bis(4-hydroxyphenyl)-3,3,5-trimethylcyclohexane;
1,1-bis(3-chloro-4-hydroxyphenyl)-3,3,5-trimethylcyclohexane;
1,1-bis(3-bromo-4-hydroxyphenyl)-3,3,5-trimethylcyclohexane;
1,1-bis(4-hydroxy-3-methylphenyl)-3,3,5-trimethylcyclohexane;
1,1-bis(4-hydroxy-3-isopropylphenyl)-3,3,5-trimethylcyclohexane;
1,1-bis(3-t-butyl-4-hydroxyphenyl)-3,3,5-trimethylcyclohexane;
1,1-bis(3-phenyl-4-hydroxyphenyl)-3,3,5-trimethylcyclohexane;
1,1-bis(3,5-dichloro-4-hydroxyphenyl)-3,3,5-trimethylcyclohexane;
1,1-bis(3,5-dibromo-4-hydroxyphenyl)-3,3,5-trimethylcyclohexane;
1,1-bis(3,5-dimethyl-4-hydroxyphenyl)-3,3,5-trimethylcyclohexane;
1,1-bis(3-chloro-4-hydroxy-5-methylphenyl)-3,3,5-trimethylcyclohexane;
1,1-bis(3-bromo-4-hydroxy-5-methylphenyl)-3,3,5-trimethylcyclohexane;

1,1-bis(3-chloro-4-hydroxy-5-isopropylphenyl)-3,3,5-trimethylcyclohexane;
1,1-bis(3-bromo-4-hydroxy-5-isopropylphenyl)-3,3,5-trimethylcyclohexane;
1,1-bis(3-t-butyl-5-chloro-4-hydroxyphenyl)-3,3,5-trimethylcyclohexane;
1,1-bis(3-bromo-5-t-butyl-4-hydroxyphenyl)-3,3,5-trimethylcyclohexane;
bis(3-chloro-5-phenyl-4-hydroxyphenyl)-3,3,5-trimethylcyclohexane;
1,1-bis(3-bromo-5-phenyl-4-hydroxyphenyl)-3,3,5-trimethylcyclohexane;
1,1-bis(3,5-disopropyl-4-hydroxyphenyl)-3,3,5-trimethylcyclohexane;
1,1-bis(3,5-di-t-butyl-4-hydroxyphenyl)-3,3,5-trimethylcyclohexane;
1,1-bis(3,5-diphenyl-4-hydroxyphenyl)-3,3,5-trimethylcyclohexane;
1,1-bis(4-hydroxy-2,3,5,6-tetrachlorophenyl)-3,3,5-trimethylcyclohexane;
1,1-bis(4-hydroxy-2,3,5,6-tetrabromophenyl)-3,3,5-trimethylcyclohexane;
1,1-bis(4-hydroxy-2,3,5,6-tetramethylphenyl)-3,3,5-trimethylcyclohexane;
1,1-bis(2,6-dichloro-3,5-dimethyl-4-hydroxyphenyl)-3,3,5-trimethylcyclohexane;
1,1-bis(2,6-dibromo-3,5-dimethyl-4-hydroxyphenyl)-3,3,5-trimethylcyclohexane;
4,4'dihydroxy-1,1-biphenyl; 4,4'-dihydroxy-3,3'-dimethyl-1,1-biphenyl;
4,4'-dihydroxy-3,3'-dioctyl-1,1-biphenyl; 4,4'-dihydroxydiphenylether;
4,4'-dihydroxydiphenylthioether; 1,3-bis(2-(4-hydroxyphenyl)-2-propyl)benzene;
1,3-bis(2-(4-hydroxy-3-methylphenyl)-2-propyl)benzene;
1,4-bis(2-(4-hydroxyphenyl)-2-propyl)benzene and
1,4-bis(4-(4-hydroxy-3-methylphenyl)-2-propyl)benzene.

Suitable dihydroxy benzenes II are illustrated by hydroquinone, resorcinol, methylhydroquinone, butylhydroquinone, phenylhydroquinone, 4-phenylresorcinol and 4-methylresorcinol. These may be stabilized or unstabilized.

Suitable dihydroxy naphthalenes III are illustrated by 2,6-dihydroxy naphthalene;
2,6-dihydroxy-3-methyl naphthalene; and 2,6-dihydroxy-3-phenyl naphthalene.

Suitable dihydroxy naphthalenes IV are illustrated by 1,4-dihydroxy naphthalene;
1,4-dihydroxy-2-methyl naphthalene; 1,4-dihydroxy-2-phenyl naphthalene and 1,3-dihydroxy naphthalene.

The relative amounts of compounds are selected based on the desired composition of the oligomers and polymers. If other comonomers are used, they can be introduced to the melt reaction system as part of the same feed, in a separate feed, or both.

The Carbonate Source:

In the production of polycarbonate in accordance with the present invention, the compounds which react with the dihydroxy compounds to form carbonate linkages (i.e. the carbonate source) may be carbonate diesters, carbonyl halides, etc. Specific examples include: diphenyl carbonate, ditolyl carbonate, bis(chlorophenyl) carbonate, m-cresyl carbonate dinaphthyl carbonate, bis(diphenyl)carbonate, diethyl carbonate, dimethyl carbonate, dibutyl carbonate, dicyclohexyl carbonate, and other carbonate diesters, phosgene, and other carbonyl halides. Of the various compounds of this type diphenyl carbonate (DPC) is often preferred.

The carbonate source can also be derived from an activated dicarbonate or a mixture of an activated carbonate with non-activated carbonate. A preferred activated dicarbonate of the present invention is an activated diarylcarbonate such as bis-methylsalicylcarbonate (BMSC). However, as used herein the term "activated carbonate" is defined as a diarylcarbonate which is more reactive than diphenyl carbonate toward transesterification reactions. Such activated carbonates are of the general formula:

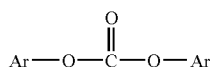

wherein Ar is a substituted aromatic radical having 6 to 30 carbon atoms. The preferred activated carbonates have the more specific general formula:

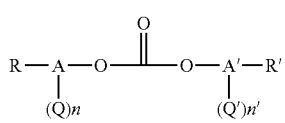

wherein Q and Q' are each independently activating groups. A and A' are each independently aromatic rings which can be the same or different depending on the number and location of their substituent groups, and n and n' are whole numbers of zero up to a maximum equivalent to the number of replaceable hydrogen groups substituted on the aromatic rings A and A', wherein A+A' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A' minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

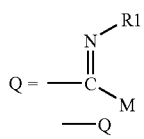

Q = Halogen or NO$_2$

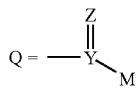

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o- chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diarylcarbonate having the structure:

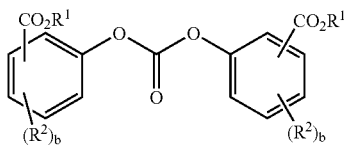

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0-4. At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low volatility and possesses a similar reactivity to bisphenoi-A. The model transesterification reaction is carried out at temperatures above the melting points of the certain diarylcarbonate and para-cumyl phenol and in the presence of a transesterification catalyst, which is usually an aqueous solution of sodium hydroxide or sodium phenoxide. A preferred concentration of the transesterification catalyst is about 0.001 mole % based on the number of moles of the phenol or diarylcarbonate, and a preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses an equilibrium constant of greater than 1 is considered to possess a more favorable equilibrium than diphenyicarbonate and is an activated carbonate, whereas a diarylcarbonate which possesses an equilibrium constant of 1 or less is considered to possess the same or a less favorable equilibrium constant than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diphenylcarbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diarylcarbonate still more reactive than diphenyl carbonate.

The theoretical stoichiometry of the reaction within the melt polymerization reaction system requires a molar ratio of dihydroxy composition to diarylcarbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Catalyst System

The catalyst system of the present invention comprises a first catalyst compound that has the structure:

$M_pH_qQ$ wherein Q is a phosphate, a sulfate, a phosphite, a sulfite, a thiosulfate, or a thiophosphate; H is hydrogen; M is an alkali metal, an alkali earth metal, or ($NH_4$); and p and q are independently 1 or 2. In particularly preferred embodiments Q is a phosphate or a sulfate, H is a hydrogen, M is an alkali metal or alkali earth metal; and p and q are independently 1 or 2.

A non-limiting list of examples of compounds suitable for use as the first catalyst compound are: $(NH_4)H_2PO_4$, $(NH_4)_2HPO_4$, $K_2HPO_4$, $KNaHPO_4$, and $Na_2HPO_4$. In particularly preferred embodiments the first catalyst compound comprises a compound selected from the group consisting of $K_2HPO_4$, $KNaHPO_4$, and $Na_2HPO_4$.

In preferred embodiments the first catalyst compound is a phosphorus or sulfur containing compound and is also a source of alkali earth ions or alkali metal ions. The amount of the first catalyst compound employed in the reaction mixture is to be enough such that the amount of earth or metal ions present in the reaction mixture is in a range between about $10^{-4}$ and about $10^{-8}$, for example in a range between $10^{-4}$ and about $10^{-7}$, moles alkali earth ion or alkali metal ion per mole of dihydroxy compound employed.

In a preferred embodiment of the present invention the catalyst system further comprises a second catalyst compound comprising: a quaternary ammonium compound, a quaternary phosphonium compound, or both a quaternary ammonium compound and a quaternary phosphonium compound.

The quaternary ammonium compound is selected from the group of organic ammonium compounds having structure VI,

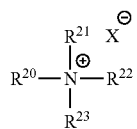

VI wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds comprising structure VI are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure VII,

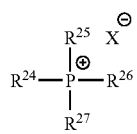

VII wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds comprising structure VII are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in structures VI and VII are properly balanced. For example, where $R^{20}$-$R^{23}$ in structure VII are each methyl groups and $X^-$ is carbonate, it is understood that $X^-$ represents $\frac{1}{2}$ $(CO_3^{-2})$.

In order to achieve the formation of polycarbonate using the method of the present invention, where a second catalyst compound is employed, an effective amount of quaternary ammonium and/or phosphonium catalyst must be employed. The amount of quaternary ammonium and/or phosphonium catalyst employed is typically based upon the total number of moles of dihydroxy compounds employed in the polymerization reaction. When referring to the ratio of catalyst, for example phosphonium salt VII, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts VI or VII employed typically will be in a range between $1\times10^{-2}$ and $1\times10^{-5}$, preferably between $1\times10^{-3}$ and $1\times10^{-4}$ moles per mole of the first and second dihydroxy compounds combined. The phosphorus or sulfur containing compound typically will be used in an amount corresponding to between $1\times10^{-4}$ and about $1\times10^{-8}$, preferably $1\times10^{-4}$ and $1\times10^{-7}$ moles of phosphorus or sulfur containing compound per mole of the dihydroxy compounds combined.

The catalyst system may be introduced to the reaction mixture continuously, or may be introduced batchwise. The addition may occur before, during or after the introduction of the carbonate source or the dihydroxy compound(s) to the reaction mixture or while the reaction mixture is in the melt polymerization reaction system. Where both a first and second catalyst compound are employed they may be added together or separately through the process.

EXAMPLES

The following examples are set forth to provide one of ordinary skill in the art with a complete description of how the methods claimed herein are made and evaluated, and are not intended to limit the scope of what the inventors regard as their invention.

Molecular weights are reported as molecular weight average (Mw) and were determined by GPC analysis of polycarbonate prepared by melt polymerization. Standards of polystyrene were used to construct a universal calibration against which polycarbonate could be measured using Mark-Houwink equation.

Endcap (EC) levels were calculated from the free —OH content and Mn values. Free —OH content was measured by UV/visible analysis of the complexes formed from the polymer with $TiCl_4$ in methylene chloride solution.

Fries content was measured by the KOH methanolysis of resin and is reported as parts per million. The content of Fries was determined as follows. First, 0.5 grams of polycarbonate was dissolved in 4.0 ml of THF (containing p-terphenyl as internal standard). Next, 3.0 ml of 18% KOH in methanol was added to the solution. The resulting mixture was stirred for two hours at this temperature. Next, 1.0 ml of acetic acid was added, and the mixture was stirred for 5 minutes. Potassium acetate was allowed to crystallize over 1 hour. The solid was filtered off and the resulting filtrate was analyzed by liquid chromatography using p-terphenyl as the internal standard.

Oxalic acid in Hydroquinone was measured by an HPLC method, using:
Equipment: Shimadzu HPLC 2010 system
Column: Shodex SUGAR SH1011
Mobile Phase: 0.01N $H_2SO_4$ in Water
Column oven temperature: 50° C.
Detection wavelength: 204 nm Comparative Example A continuous reaction system was used. The apparatus consists of one melter, one compound mix agitation tank, two pre-polymerization tanks and two horizontally agitated reactors. Bisphenol-A, Hydroquinone, and Diphenylcarbonate, in a molar ratio of Diphenylcarbonate to dihydroxyl compounds of 1.1 to 1, being the Bisphenol-A and Hydroquinone in a molar ratio of 70/30, were continuously supplied to a heated agitation tank where a uniform solution was produced.

Two types of Hydroquinone pellets with different amounts of oxalic acid were fed into the melter, operating at 204° C., prior to forming the uniform solution. The pellets had an initial oxalic acid content of 183 ppm and 163 ppm. After melting the oxalic acid content in the melted Hydroquinone measured at 1365 ppb and 675 ppb respectively. The decrease in oxalic acid content is believed to be due to degradation of the same during melting.

About $1.1 \times 10^{-4}$ mol/mol (tetrabutyl phosphonium acetate (TBPA))/(Bisphenol-A and Hydroquinone) of TBPA catalyst was added in the formulation tank and $550 \times 10^{-6}$ mol/mol (NaOH /(Bisphenol-A and Hydroquinone) of NaOH catalyst was added in the first reactor. The formulated mixture was successively supplied from each polymerization reactor to the next one allowing for the production of a final product with Mw (PS)=48,000-59,000, EC>71, Fries<1000.

After 48 hours of continuous operation nineteen samples were taken in a row, showing the following analytical data displayed in Table 1 and in FIGS. 1 and 2.

TABLE 1

Continuous Run with Catalysts TBPA/NaOH

| Sample # | ppb oxalic | Mw (PS) | EC | Fries |
| --- | --- | --- | --- | --- |
| 1 | 1365 | 51091 | 79.7 | |
| 2 | 1365 | 54533 | 77.83 | 2802 |
| 3 | 1365 | 53764 | | |
| 4 | 1365 | 52710 | 73.86 | 3349 |
| 5 | 1365 | 56573 | | |
| 6 | 1365 | 58930 | 72.25 | 3666 |
| 7 | 1365 | 53578 | | |
| 8 | 1365 | 49731 | 71.53 | 3128 |
| 9 | 1365 | 50822 | | |
| 10 | 1365 | 48028 | 73.49 | 3604 |
| 11 | 675 | 50278 | | |
| 12 | 675 | 68845 | 60.61 | 5281 |
| 13 | 675 | 65956 | | |
| 14 | 675 | 49716 | 60.27 | |
| 15 | 675 | 46975 | | |
| 16 | 675 | 61691 | 58.6 | 5845 |
| 17 | 675 | 67150 | | |
| 18 | 675 | 59726 | 58.14 | 5152 |
| 19 | 675 | 42365 | | |

The comparative results, displayed in table 1 and in FIGS. 1 and 2, show that using an acid stabilized dihydroxy compound together with a basic catalyst system such as TBPA/NaOH results in variable molecular weight build in the resulting product polycarbonate. Also, when the amount of acid stabilizer is reduced (i.e. from 1365 ppb to 675 ppb), large variations in molecular weight build levels are observed. See FIG. 1. Similar upsets are also observed in the final product properties including fluctuations in the Fries and end capping levels when the oxalic acid load is decreased. The process upsets are believed to be due to the increase of free NaOH in the process, yielding to a large fluctuation in Mw(PS), end cap, and Fries. See FIG. 1.

Imvention Example

The reaction was carried out as in Example 1 with the exception that instead of NaOH catalyst an inorganic salt $KNaHPO_4$ was used, and the oxalic acid stabilizer of the Hydroquinone pellets were higher.

A continuous reaction system was used. The apparatus consists of one monomer mix agitation tank, two pre-polymerization tanks and two horizontally agitated reactors. Bisphenol-A, Hydroquinone, and Diphenylcarbonate, in a molar ratio of Diphenyl carbonate to dihydroxyl compounds of 1.1 to 1, being the Bisphenol-A and Hydroquinone in a molar ratio of 70/30, were continuously supplied to a heated agitation tank where a uniform solution was produced.

Two types of Hydroquinone pellets with different amounts of oxalic acid were fed into the melter prior to forming the uniform solution. In sample numbers 1 to 7 below, pellets having an initial oxalic acid content of 158 ppm were fed to the melter operating at 203° C. After melting the oxalic acid content in the melted Hydroquinone measured at 646 ppb. In sample numbers 8 to 14 below pellets having an initial oxalic acid content of 67 ppm were fed to the melter operating at 199° C. After melting the oxalic acid content in the melted Hydroquinone measured at 2322 ppb.

The decrease in oxalic acid content from the starting pellets to the melted Hydroquinone is believed to be due to degradation of the same during melting. As the melter operating temperature is decreased from 203° C. to 199° C. less of the oxalic acid was degraded resulting in a melted Hydroquinone having a higher level of acid stabilizer.

About $1.1 \times 10^{-4}$ mol/mol (tetrabutyl phosphonium acetate (TBPA))/(Bisphenol-A and Hydroquinone) of TBPA catalyst was added in the formulation tank and $1.25 \times 10^{-6}$ mol/mol ($KNaHPO_4$)/(Bisphenol-A and Hydroquinone) of $KNaHPO_4$ was added in the first reactor. The formulated mixture was successively supplied from each polymerization reactor to the next one allowing the production of a final product with Mw (PS)=48,000-59,000, EC>71, Fries<1000.

After 28 hours of continuous operation fourteen samples were taken in a row, showing the data contained in Table 2 and in FIGS. 3 and 4.

TABLE 2

Catalyst TBPA/$KNaHPO_4$

| Sample # | oxalic acid (ppb) | Mw (PS) | EC | Fries |
| --- | --- | --- | --- | --- |
| 1 | 646 | 51252 | | |
| 2 | 646 | 51744 | 87.43 | 609 |
| 3 | 646 | 49147 | | |
| 4 | 646 | 51962 | 86.66 | 583 |
| 5 | 646 | 55834 | | |
| 6 | 646 | 53576 | | |
| 7 | 646 | 52660 | 83.84 | 909 |
| 8 | 2322 | 52059 | | |
| 9 | 2322 | 52646 | 84.19 | 816 |
| 10 | 2322 | 52599 | | |
| 11 | 2322 | 52225 | 85.56 | 563 |
| 12 | 2322 | 51379 | | |
| 13 | 2322 | 50912 | 85.91 | 575 |
| 14 | 2322 | 53299 | | |

The results shown in table 2 and FIGS. 3 and 4 demonstrate that stability of Mw (PS) and Fries levels of the final product polycarbonate can be achieved even when varying the level of acid stabilizer within the reaction mixture. As demonstrated at both low and high levels of oxalic acid, Mw (PS) build, end cap, and Fries level remained relatively constant (as compared to the Comparative Example) showing the lack of reactivity between catalyst system and the oxalic acid stabilizer.

The invention claimed is:

1. A method of producing a polycarbonate comprising the steps of,
   (i) introducing to a melt polymerization reactor system comprising a polymerization reactor operating under melt polymerization conditions, a reaction mixture comprising:
   an acid stabilizer and a first dihydroxy compound selected from the group consisting of catechol, resorcinol, hydroquinone, butyl hydroquinone, methyl hydroquinone, DMBPC, biphenol, o,o-biphenol, 2,2-dihydroxynaphtalene, and ortho-methyl BPA,
   an activated diarylcarbonate,
   and a polymerization catalyst system comprising a first catalyst compound having the structure:

$M_pH_qQ$ wherein Q is phosphate, sulfate, phosphite, sulfite, thiosulfate, or thiophosphate; H is hydrogen; M is an alkali metal, an alkali earth metal, or $(NH_4)$; and p and q are independently 1 or 2, and wherein the first catalyst compound is present in an amount sufficient to catalyze a polymerization reaction between the free hydroxyl ends of the first dihydroxy compound and the activated diarylcarbonate, and
   (ii) allowing the reaction mixture to polymerize thereby forming polycarbonate.

2. The method of claim 1, wherein Q is phosphate or sulfate, and M is an alkali metal or alkali earth metal.

3. The method of claim 2, wherein the first catalyst compound comprises a compound selected from the group consisting of $K_2HPO_4$, $KNaHPO_4$, and $Na_2HPO_4$.

4. The method of claim 1, wherein the activated diarylcarbonate comprises bismethylsalicylcarbonate.

5. The method of claim 1, wherein the polycarbonate is a copolycarbonate and wherein the method further comprises the step of adding a second dihydroxy compound to the reaction mixture.

6. The method of claim 1, wherein the first catalyst compound is present in the reaction mixture such that the molar ratio of moles of the first catalyst compound to the total moles of dihydroxy compound is between $1\times10^{-4}$ and $1\times10^{-8}$.

7. The method of claim 6, wherein the first catalyst compound is present in the reaction mixture such that the molar ratio of moles of the first catalyst compound to the total moles of dihydroxy compound is between $1\times10^{-4}$ and $1\times10^{-7}$.

8. The method of claim 6, wherein Q is phosphate or sulfate, and M is an alkali metal or alkali earth metal.

9. The method of claim 8, wherein the first catalyst compound comprises a compound selected from the group consisting of $K_2HPO_4$, $KNaHPO_4$, and $Na_2HPO_4$.

10. The method of claim 1, wherein the polymerization catalyst system further comprises a second catalyst compound comprising: quaternary ammonium compound, a quaternary phosphonium compound, or both a quaternary ammonium compound and a quaternary phosphonium compound.

11. The method of claim 1, further comprising the step of:
    (iii) removing the polycarbonate from the melt polymerization reactor system.

12. The method of claim 11, wherein at least one of steps (i), (ii), and (iii) is performed continuously.

13. The method of claim 11, wherein all of steps (i), (ii), and (iii) are performed continuously.

14. A method of producing a polycarbonate comprising the steps of,
    (i) introducing to a melt polymerization reactor system comprising a polymerization reactor operating under melt polymerization conditions, a reaction mixture comprising a first dihydroxy compound and an acid stabilizer, a carbonate source, and a polymerization catalyst system comprising a first catalyst compound having the structure:

$M_pH_qQ$ wherein Q is phosphate, sulfate, phosphite, sulfite, thiosulfate, or thiophosphate; H is hydrogen; M is an alkali metal, an alkali earth metal, or $(NH_4)$; and p and q are independently 1 or 2, and wherein the first catalyst compound is present in an amount sufficient to catalyze a polymerization reaction between the free hydroxyl ends of the first dihydroxy compound and the carbonate source, and
    (ii) allowing the reaction mixture to polymerize thereby forming polycarbonate.

15. The method of claim 14, wherein Q is phosphate or sulfate, and M is an alkali metal or alkali earth metal.

16. The method of claim 15, wherein the first catalyst compound comprises a compound selected from the group consisting of $K_2HPO_4$, $KNaHPO_4$, and $Na_2HPO_4$.

17. The method of claim 14, wherein the first dihydroxy compound comprises a compound having the structure,

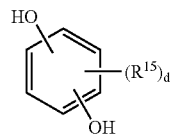

wherein each $R^{15}$ is independently at each occurrence a hydrogen atom, halogen atom, nitro group, cyano group, $C_1$-$C_{20}$ alkyl, $C_4$-$C_{20}$ cycloalkyl radical, $C_4$-$C_{20}$ aryl radical, and d is an integer from 0 to 4.

18. The method of claim 17, wherein the first dihydroxy compound is selected from the group consisting of catechol, resorcinol, hydroquinone, butyl hydroquinone, and methyl hydroquinone.

19. The method of claim 14, wherein the first dihydroxy compound is selected from the group consisting of DMBPC, biphenol, o,o-biphenol, 2,2-dihydroxynaphtalene, and ortho-methyl BPA.

20. The method of claim 14, wherein the carbonate source comprises bismethylsalicylcarbonate.

21. The method of claim 14, wherein the polycarbonate is a copolycarbonate and wherein the method further comprises the step of adding a second dihydroxy compound to the reaction mixture.

22. The method of claim 14, wherein the first catalyst compound is present in the reaction mixture such that the molar ratio of moles of the first catalyst compound to the total moles of dihydroxy compound is between $1\times10^{-4}$ and $1\times10^{-8}$.

23. The method of claim 22, wherein the first catalyst compound is present in the reaction mixture such that the molar ratio of moles of the first catalyst compound to the total moles of dihydroxy compound is between $1\times10^{-4}$ and $1\times10^{-7}$.

24. The method of claim 22, wherein Q is phosphate or sulfate, and M is an alkali metal or alkali earth metal.

25. The method of claim 24, wherein the first catalyst compound comprises a compound selected from the group consisting of $K_2HPO_4$, $KNaHPO_4$, and $Na_2HPO_4$.

26. The method of claim 14, wherein the polymerization catalyst system further comprises a second catalyst compound comprising: quaternary ammonium compound, a quaternary phosphonium compound, or both a quaternary ammonium compound and a quaternary phosphonium compound.

27. The method of claim 14, further comprising the step of:
(iii) removing the polycarbonate from the melt polymerization reactor system.

28. The method of claim 27, wherein at least one of steps (i), (ii), and (iii) is performed continuously.

29. The method of claim 27, wherein all of steps (i), (ii), and (iii) are performed continuously.

* * * * *